United States Patent [19]
James

[11] 3,809,421
[45] May 7, 1974

[54] LEAF AND RUBBISH SHOVEL

[76] Inventor: Horace A. James, 6662 Blakemore St., Philadelphia, Pa. 19119

[22] Filed: May 9, 1973

[21] Appl. No.: 358,527

[52] U.S. Cl................ 294/50.8, 294/1 R, 294/118, 56/400.12
[51] Int. Cl............................................. A01b 1/20
[58] Field of Search............ 294/1 R, 16, 19 R, 49, 294/50.5–50.9, 51, 52, 99 R, 118; 15/221, 257.1, 257.6; 56/400.04, 400.11, 400.12

[56] References Cited
UNITED STATES PATENTS

| | | | |
|---|---|---|---|
| 1,005,247 | 10/1911 | Lovett | 294/50.8 |
| 1,138,371 | 5/1915 | Flynn | 294/50.8 |
| 2,546,113 | 3/1951 | Spang | 294/1 R |
| 3,328,066 | 6/1967 | Johnston | 294/19 R |
| 3,692,347 | 9/1972 | Bixler | 294/99 S |

Primary Examiner—Evon C. Blunk
Assistant Examiner—Johnny D. Cherry
Attorney, Agent, or Firm—D. Paul Weaver

[57] ABSTRACT

This specification discloses a leaf and rubbish shovel comprising two blades, each of which consists of upper and lower sections that are connected for movement relative to each other by a flexible metallic strip with a leaf spring biasing the sections to a normal relation. The two upper sections are hingedly connected and a handle is anchored at one end to each of these upper sections. The handles are dimensioned to be grasped by the hands of a user with each handle having a laterally and outwardly extending arm that assumes a position under the forearm in the area of the elbow to enable the user to handle heavy masses of material gathered by the shovel. The sections of each blade may be moved relative to each other by flexing the strip which connects them with stops being provided to limit the flexing movement in each direction.

The present invention relates to devices of the shovel type which are intended primarily for gathering and handling leaves and rubbish and is concerned primarily with certain improvements which facilitate handling of heavy masses gathered by the shovel and the dumping of such materials into a receptacle.

12 Claims, 4 Drawing Figures

PATENTED MAY 7 1974 3,809,421
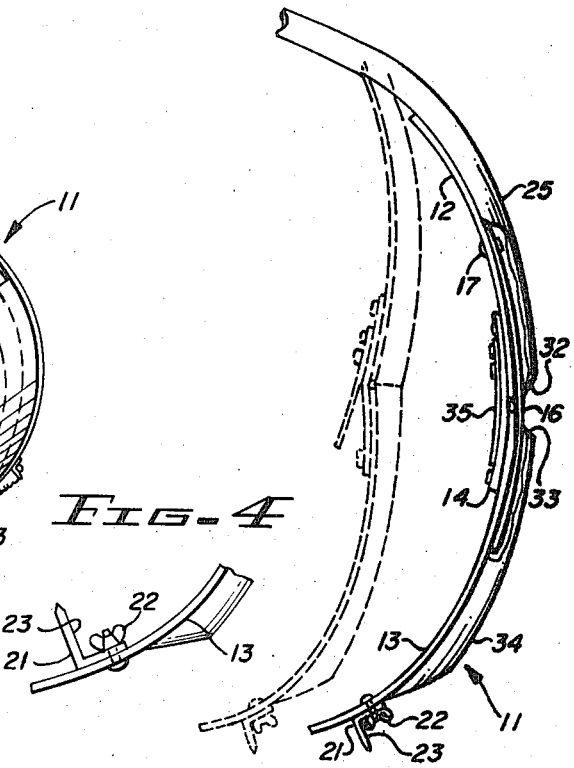
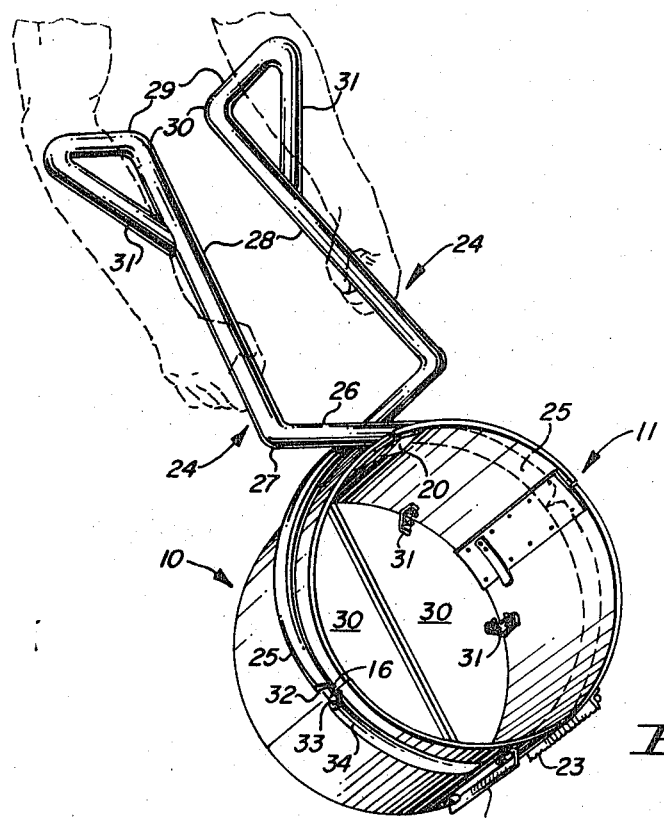
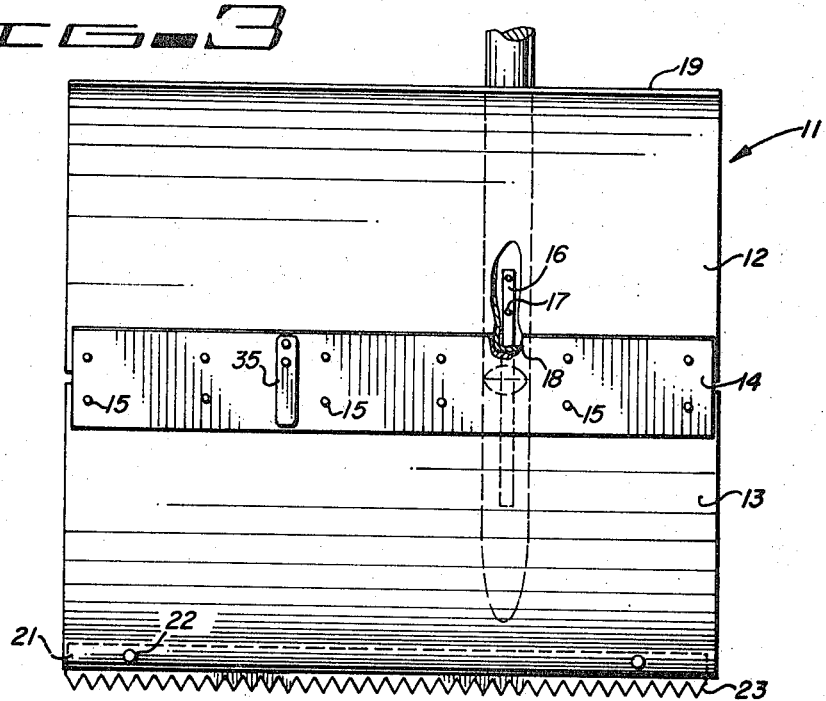

3,809,421

LEAF AND RUBBISH SHOVEL

BACKGROUND OF THE INVENTION

At the present time there is known and available to the public a class of devices which are characterized as comprising two confronting rake-like elements which are hingedly connected and have handles extending therefrom. These devices have been provided for the most part for agricultural purposes such as the digging of potatoes and gathering vegetables from the ground. At least one such known device is intended for the gathering of leaves and debris.

These now available devices are not capable of gathering leaves and debris and handling the gathered material with a high degree of facility. This shortcoming is attributed to certain structural features. In the first place the rake-like elements include curved tines which are in contrast to blades having continuous surfaces. Many small articles of rubbish will pass through the spaces between tines while no such interstices are present in a blade.

Then again it is often desirable to dump gathered material into a receptacle by moving the gathering elements, whether they be rakes or blades into a vertical position in which the material will flow out of the downward open end defined by the two elements. In the case of rakes the material will catch on the tines and its downward movement impeded. Simple unitary blades will prove to be far from satisfactory in this respect due to the fact that in many instances the material will be compacted to a high degree and can be released only by moving the blades apart a wide distance which detracts from their ability to guide the material into the receptacle.

Another factor of inconvenience which attends these known devices is encountered when a weighty mass of material has been gathered and is then to be manipulated. These devices include handles which are straight and have hand grips at their free ends. Thus they are adapted to be grasped only by the hands of a user and are not susceptible of having other parts of the arms applied thereto to relieve the hands of some of the weight.

OBJECTS OF THE INVENTION

With the foregoing conditions in mind the present invention has in view the following objectives:

1. To provide a leaf and rubbish shovel which includes a pair of complemental curved blades which are hingedly connected and from each of which extends a handle that is provided with a laterally and outwardly extending arm at its free end that is adapted to engage the underside of a user's forearm in the area of the elbow and thereby sustain a part of the weight of the shovel and the material gathered thereby;

2. To provide, in a leaf and rubbish shovel of the type noted, a pair of blades each comprising upper and lower sections which are hingedly connected for movement relative to each other by a flexible metallic strip; and 3. To provide, in a leaf and rubbish shovel of the character aforesaid, two sectional blades each having stops for limiting flexing movement of the sections of that blade.

Various other more detailed objects and advantages of the invention, such as arise in carrying out the above ideas in a practical embodiment, will in part become apparent and in part be hereinafter stated as the description of the invention proceeds.

SUMMARY OF THE INVENTION

The foregoing objects are achieved by providing a leaf and rubbish shovel comprising two semi-cylindrical blades each consisting of upper and lower sections. The sections of each blade are connected by a flexible metallic strip. Stops are provided on each blade for limiting movement of the sections relative to each other which is provided for by the flexible strip. A leaf spring is mounted on one section and extends over the other section to bias the sections into a normal position.

The upper sections of the blades are hingedly connected. A pair of handles extend from the upper sections with one end of each handle being anchored to an upper section. The free end of each handle is formed with a laterally and outwardly extending arm that is adapted to engage the underside of the forearm of a user in the area of the elbow.

For a full and more complete understanding of the invention reference may be had to the following description and accompanying drawing wherein:

FIG. 1 is a perspective of a leaf and rubbish shovel embodying the precepts of this invention with the arms of a user being depicted in broken lines.

FIG. 2 is a fragmentary side elevation of one side of the device of the present invention with a part broken away illustrating in full lines one limit of the flexing movement, and in broken lines the other limit of such flexing movement.

FIG. 3 is an elevation on an enlarged scale looking at the inner side of one blade; and FIG. 4 is a fragmentary side elevation showing a different positioning of an attachment from that shown by FIG. 3.

DESCRIPTION OF THE PREFERRED EMBODIMENT

Referring now to the drawing a leaf and rubbish shovel made in accordance with the principles of this invention is shown as comprising two blades which are identified in their entirety at 10 and 11. Each of blades 10 and 11 is substantially semi-cylindrical and complement one another when in closed position to define a cylinder that is open at both ends. Blades 10 and 11 are mirror duplicates and the detailed construction of only one of them is herein described as that is believed to be sufficient for the purposes of this specification.

Referring now to FIGS. 2 and 3 blade 11 is shown as comprising an upper section 12 and a lower section 13. These sections are secured in assembled relation by a flexible metallic strip 14 that is attached to the respective sections in any preferred manner as by rivets 15. A leaf spring 16 has one end anchored to the outside of section 12 as by rivets 17 and slides over the outer face of section 13, being positioned internally with respect to hollow arcuate portion 25 and hollow arcuate abutment member 34. The function of spring 16 is to bias sections 12 and 13 into what might be called their normal relative positions.

Upper sections 12 have upper edges 19 which are slightly spaced apart to accommodate relative swinging movement of blades 10 and 11 provided by a hinge 20 (FIG. 1) which spans the space between edges 19.

A so called "rake edge" is attached to the lower edge of each section 13 and takes the form of a strip 21 of metal which is secured to section 13 by bolt and wing nut assemblies 22. Strip 21 is formed with a flange 23 which is serrated to provide the toothed or rake edge. It will be noted that the opposite section 13 has a flange 23A with a smooth edge for scrapping purposes.

A handle is connected to and extends from the upper section 12 of each of blades 10 and 11. Each of these handles is identified generally at 24 in FIG. 1. Each handle 24 comprises an arcuate end portion 25 that is of a curvature corresponding to the outer surface of section 12 which it engages and to which it is secured in any preferred manner as by being welded or riveted thereto.

Integrally joined to arcuate portion 25 at each handle 24 is a straight portion 26 and the latter is integrally connected by a bend 27 with an elongate part 28. It is notable that elongate parts 28 of the two handles 24 converge when blades 24 are closed as shown in FIG. 1. Extending laterally and outwardly from each elongate part 28 is a so called "support arm" 29 which is integrally connected to part 28 by a bend 30. An arm brace 31 extends from the outer end of each arm 29 to elongate part 28.

Flexing movement of sections 12 and 13 is limited by two stops. One stop comprises the bevelled end 32 of the arcuate portion 25 of handle 24. Bevelled end 32 cooperates with bevelled end 33 on an abutment member 34 which is fastened to the outer surface of section 13 in any preferred manner as by welding. Spring 16 extends through suitable slits in bevelled ends 32 and 33. The broken line position of FIG. 2 depicts bevelled ends 32 and 33 in abutting engagement to limit flexing movement of sections 12 and 13 in one direction.

The other stop takes the form of a rigid metallic tab 35 the upper end portion of which is attached to strip 14 in the area overlying section 12. The other end portion of tab 35 is either spaced from that portion of strip 14 which overlies section 13 as shown in broken lines in FIG. 2, or engages this area of strip 14 as depicted in full lines in FIG. 2 to limit the flexing of sections 12 and 13 in the opposite direction.

In another embodiment of the ingenious concept heretofore portrayed another embodiment is herewith given detailed consideration. It will be appreciated that large quantities of small particulate materials may be carried by attaching to at least one end of the device a semi-circular flat member 30 to blade 10 and blade 11. The attached is achieved through L-shaped brackets fastened to the blade by bolts and wing nuts 31. Of course, with the flat member 30 in position the flexing of the sections 12 and 13 cannot be achieved.

OPERATION

The manner in which the subject shovel is used and functions is believed to be obvious from the illustrations of the drawing and description of parts set forth above. However, it is briefly described as follows:

It is first noted that blades 10 and 11 may be of any desired length and are not to be limited to the precise axial dimension illustrated. This dimension was selected to facilitate illustration.

Handles 24 are grasped by a user with the hands gripping elongate parts 28 and support arms 29 engaging the undersides of the user's forearms in the areas of the elbows. This relation of the user's arms to the handles is represented by broken lines in FIG. 1.

To open blades 10 and 11 handles 24 are swung apart. The shovel is then manipulated to move "rake edges" 23 over ground surfaces to gather leaves and debris. The mass of these materials builds up in the space between the blades whereupon handles 24 are contracted to compact the mass. With a compact mass in the space defined by the closed blades the shovel may be raised and manipulated to bring an open end thereof into a position over a receptacle. The engagement of support arms 29 with the user's forearms facilitates such raising and handling because a large amount of the weight will be taken by support arms 29.

With the loaded shovel in the above position over a receptacle handles 24 may be opened slightly and again contracted to break the compact mass free of the blades. These movements of the handles cause the sections of the blades to flex in the manner depicted in FIG. 2. With the load so broken loose it will fall downwardly and be guided by the blades much in the manner in which a funnel functions.

While a preferred specific embodiment of the invention is hereinbefore set forth it is to be clearly understood that the invention is not to be limited to the exact constructions, mechanisms and materials illustrated and described because various modifications of these details may be provided in putting the invention into practice.

What is claimed is:

1. In a shovel,
   a. a pair of complemental confronting curved blades which are hingedly connected at upper edges thereof and which in closed position define a hollow member,
   b. each of said blades comprising an upper section and a lower section which are connected by hinge means,
   c. spring means having one end anchored to one section and extending over a portion of the other section of the blade in which said sections are included with the spring means biasing said sections into a normal position relative to each other,
   d. means for limiting flexing relative movement of the sections of a blade thereby limiting flexing movement in either direction, and
   e. a pair of handles each of which has one end connected to and extending from the upper section of a blade.

2. The shovel of claim 1 in which the blades are substantially semi-cylindrical.

3. The shovel of claim 1 in which the spring means of each blade is a leaf spring.

4. The shovel of claim 1 in which the hinge means is a flexible metal strip.

5. The shovel of claim 1 together with at least one means having a rake edge removably secured to the edge portion of a lower section that is remote from the hinge means of the lower section to the upper section of that blade.

6. The shovel of claim 1 wherein each of the handles at the other end have a support arm extending outwardly and laterally from the other end of each handle.

7. The shovel of claim 6 in which each handle comprises an arcuate portion at one end which engages the outer surface of the upper section of a blade to which it is secured, a straight portion extending from the arcuate portion, an elongate part connected to said straight portion by a bend, with the support arm for that handle being connected to the elongate part by a bend, and an arm brace extending from the end of the support arm remote from the bend to said elongate part.

8. The shovel of claim 1 wherein the means for limiting relative flexing movement of the sections comprise two stops, one stop limiting flexing movement in one direction and the other stop limiting flexing movement in opposite direction.

9. The shovel of claim 8 in which one stop comprises two abutment members secured to the outer faces of the two sections of a blade and which have end surfaces which are normally spaced and which are adapted to abut to limit flexing movement of the sections of that blade.

10. The shovel of claim 9 in which the abutment member on the upper blade section takes the form of a continuation of a handle.

11. The shovel of claim 9 in which the other stop comprises a rigid tab having one end anchored to a section of one blade and extending over a portion of the other section of that blade.

12. The shovel of claim 1 wherein each of the blades along at least one of the edge portion thereof has a flat member extending towards each other to form together a divisible end wall means.

* * * * *